United States Patent
Park et al.

(10) Patent No.: US 9,524,663 B2
(45) Date of Patent: Dec. 20, 2016

(54) COLOR CALIBRATION DEVICE, COLOR CALIBRATION METHOD THEREOF, DISPLAY APPARATUS AND DISPLAY SYSTEM HAVING THE SAME

(71) Applicant: SAMSUNG ELECTRONICS CO., LTD., Suwon-si (KR)

(72) Inventors: Ji-yong Park, Suwon-si (KR); Kil-soo Park, Suwon-si (KR); Nam-kyun Beon, Seoul (KR); Sang-kyun Im, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 183 days.

(21) Appl. No.: 14/451,662

(22) Filed: Aug. 5, 2014

(65) Prior Publication Data

US 2015/0049109 A1    Feb. 19, 2015

(30) Foreign Application Priority Data

Aug. 14, 2013 (KR) .......................... 10-2013-0096813

(51) Int. Cl.
*G09G 3/00* (2006.01)
*G09G 3/20* (2006.01)
(Continued)

(52) U.S. Cl.
CPC .......... *G09G 3/2003* (2013.01); *G01J 3/0264* (2013.01); *G01J 3/462* (2013.01); *G01J 3/506* (2013.01);
(Continued)

(58) Field of Classification Search
CPC .. H04N 1/6033; H04N 1/6055; H04N 1/6075; H04N 1/6077; H04N 1/6083–1/6091; G09G 3/006; G09G 5/02; G09G 2320/029–2320/0295; G09G 2320/0666; G09G 2320/0693; G09G 2360/14–2360/145

See application file for complete search history.

(56) References Cited

U.S. PATENT DOCUMENTS 7,495,679 B2 * 2/2009 Chou ................. H04N 9/69
345/690
2004/0190019 A1 * 9/2004 Li ................... H04N 1/6033
358/1.9

(Continued)

FOREIGN PATENT DOCUMENTS

WO    2007018969 A2    2/2007

OTHER PUBLICATIONS

Communication issued on Apr. 10, 2015 by the European Patent Office in related Application No. 14170103.7.

*Primary Examiner* — Jacinta M Crawford
*Assistant Examiner* — Diane Wills
(74) *Attorney, Agent, or Firm* — Sughrue Mion, PLLC

(57) ABSTRACT

A color calibration device, a color calibration method thereof, a display apparatus and a display system having the same are provided. The color calibration device includes a storage configured to store at least one of characteristic information of a display screen that is measured by a color sensor, and color calibration information acquired by the color sensor; and a controller configured to calibrate a color of the display apparatus by using at least one of the characteristic information and the color calibration information.

27 Claims, 9 Drawing Sheets

(51) Int. Cl.
*G01J 3/02* (2006.01)
*G01J 3/46* (2006.01)
*G01J 3/50* (2006.01)
*G09G 5/02* (2006.01)

(52) U.S. Cl.
CPC ............... G09G 3/006 (2013.01); G09G 5/02 (2013.01); *G09G 2320/0606* (2013.01); *G09G 2320/0666* (2013.01); *G09G 2320/0693* (2013.01); *G09G 2360/145* (2013.01)

(56) References Cited

U.S. PATENT DOCUMENTS

| | | | | |
|---|---|---|---|---|
| 2007/0110304 | A1* | 5/2007 | Tsukada | H04N 1/6033 382/167 |
| 2008/0036719 | A1* | 2/2008 | Shyu | G01J 3/46 345/88 |
| 2011/0075923 | A1* | 3/2011 | Imai | G06K 9/4652 382/167 |
| 2011/0157409 | A1* | 6/2011 | Adachi | G09G 5/00 348/222.1 |
| 2011/0205568 | A1 | 8/2011 | Moalem et al. | |

* cited by examiner

COLOR CALIBRATION DEVICE, COLOR CALIBRATION METHOD THEREOF, DISPLAY APPARATUS AND DISPLAY SYSTEM HAVING THE SAME

CROSS-REFERENCE TO RELATED APPLICATION

This application claims priority from Korean Patent Application No. 10-2013-0096813, filed on Aug. 14, 2013 in the Korean Intellectual Property Office, the disclosure of which is incorporated herein by reference in its entirety.

BACKGROUND

1. Field

Apparatuses and methods consistent with the exemplary embodiments relate to a display apparatus, and more particularly, to a color calibration device, a color calibration method thereof, a display apparatus and a display system including the display apparatus for realizing an image in a desired color.

2. Description of the Related Art

In general, there are variations of luminance values and colors in an image processed by a display apparatus due to electrical, physical and optical features of the display apparatus. Thus, an image signal which is provided by the same input source results in slightly different colors when being displayed by different display apparatuses. For example, even if the same broadcasting program is provided to display apparatuses by airwave or satellite, colors of the broadcasting program processed by the display apparatuses are slightly different.

In view of the foregoing problem, users of display apparatuses perform color calibration to reproduce or achieve the desired colors.

An example of the color calibration is to use a color calibration device employing a color sensor. Such color calibration devices measure color coordinates X, Y and Z of color patches, i.e., red (R), green (G), blue (B) and white (W) of a display screen through the color sensor. The measured color patches are converted into calibration coefficients corresponding to target white point and gamma level of R, G, B and W input by a user through the color calibration program. The converted calibration coefficient is reflected in colors processed by the display apparatus through a color manager of the display apparatus.

However, the color calibration device is expensive and difficult to use since it measures colors through the color sensor. Accordingly, professionals who use special display apparatuses such as professional monitors, reference televisions (TVs) and large format displays (LFD), which have to reproduce accurate colors, should use such color calibration devices, but it is not easy for normal users to use such color calibration devices.

Another example of the color calibration is to use adjustment menus from display apparatuses. The aforementioned color calibration has a limited number of adjustment items such as contrast, brightness, sharpness, color, and tint and is less accurate in color calibration than the color sensor because it does not reflect the features of the display apparatus which are directly measured by the color sensor.

Accordingly, there is a need to provide a color calibration device for display apparatuses which is not expensive, is easy to use, and accurately reproduces an image in a desired color.

SUMMARY

One or more exemplary embodiments provide a color calibration device, a color calibration method thereof, a display apparatus and a display system having the same which is not expensive, is easy to use, and accurately reproduces an image in a desired color.

According to an aspect of an exemplary embodiment, there is provided a color calibration device of a display apparatus, the color calibration device including a storage configured to store at least one of characteristic information of a display screen that is measured by a color sensor, and color calibration information acquired by the color sensor; and a controller configured to calibrate a color of the display apparatus based on at least one of the characteristic information and the color calibration information.

The characteristic information may include a color patch that is measured by the color sensor with respect to the display screen.

The color patch may include color coordinates X, Y and Z of R, G, B and W.

The color calibration information may include a plurality of seed calibration coefficients that is acquired with respect to a plurality of seed points when color calibration is performed at least twice.

The seed calibration coefficients may include RGB digital calibration coefficients of the seed points that have been measured by the color sensor.

The controller may assume a calibration coefficient corresponding to a setting value that is used to calibrate the color of the display apparatus and is set by a user, based on at least one of the color patch and the plurality of seed calibration coefficients, and calibrate the color of the display apparatus by reflecting the assumed calibration coefficient.

The storage may include a first display characteristic storage configured to store therein a first color patch measured with respect to the display screen through the color sensor when the display apparatus is manufactured, and a first calibration trace storage configured to store therein first seed calibration coefficients of a plurality of first seed points that are measured by the color sensor when color calibration is repeatedly performed through the color sensor when the display apparatus is manufactured.

The controller may receive the setting value for calibrating the color of the display apparatus as desired by a user through a color calibration program, and assume a calibration coefficient corresponding to the setting value.

The color calibration program may include a graphic user interface (GUI) for inputting the setting value.

The GUI may include a luminance input part to input a luminance value, a white point value input part to input a white point, and a gamma input part to input a gamma value.

The GUI may further include an update part which includes a manufacturer update tab to update the first color patch and the first seed calibration coefficients that are measured when the display apparatus is manufactured, to values measured during an after service (A/S) of the display apparatus.

The storage may include a second display characteristic storage which stores therein a second color patch that is measured by a user through the color sensor with respect to the display screen, and a second calibration trace storage which stores therein second seed calibration coefficients of a plurality of second seed points that are measured by the color sensor when color calibration is repeatedly performed by a user through the color sensor.

The GUI further may include a usage data selection part which comprises a manufacturer data selection tab to assume a first calibration coefficient corresponding to the setting value based on the first color patch and the first seed calibration coefficients, and a user data selection tab to assume a second calibration coefficient corresponding to the setting value based on the second color patch and the second seed calibration coefficients.

The update part may further include a user update tab to update a second color patch and second seed calibration coefficients that have been previously measured by a user, to values measured later by a user.

According to an aspect of another exemplary embodiment, there is provided a color calibration method of a display apparatus, including: storing at least one of characteristic information of a display screen that is measured by a color sensor and color calibration information that is acquired by using the color sensor; and calibrating a color of the display apparatus based on at least one of the characteristic information and the color calibration information.

The storing may include storing a first color patch that is measured with respect to the display screen based on the color sensor when the display apparatus is manufactured, and storing first seed calibration coefficients of a plurality of first seed points that are measured by the color sensor when color calibration is repeatedly performed based on the color sensor when the display apparatus is manufactured.

The calibrating may include inputting a setting value to set the color of the display apparatus as desired by a user, assuming a calibration coefficient corresponding to the setting value that is set by a user based on at least one of a color patch and a plurality of seed calibration coefficients, and calibrating the color of the display apparatus by reflecting the assumed calibration coefficient.

The inputting may include inputting the setting value through a graphic user interface (GUI).

The inputting may include inputting a luminance value, inputting a white point, and inputting a gamma value.

The inputting may further include selecting a manufacturer update tab for updating a first color patch and first seed calibration coefficients measured when the display apparatus is manufactured, to values measured when the display apparatus is repaired during an after service (A/S) of the display apparatus.

The storing may include storing a second color patch that is measured with respect to the display screen by a user through the color sensor, and storing second seed calibration coefficients of a plurality of second seed points that are measured by the color sensor when color calibration is repeatedly performed by a user through the color sensor.

The inputting may further include selecting whether to measure a first calibration coefficient corresponding to a setting value based on a first color patch and first seed calibration coefficients, or whether to assume a second calibration coefficient corresponding to a setting value based on a second color patch and second seed calibration coefficients.

The color calibration method may further include one of updating the first color patch and the first seed calibration coefficients measured when the display apparatus is manufactured, to values measured when the display apparatus is repaired during an after service (A/S) of the display apparatus, and updating a second color patch and second seed calibration coefficients previously measured by a user, to values measured later by a user.

According to an aspect of another exemplary embodiment, there is provided a display apparatus including: a display configured to display an image thereon; and a color calibration device configured to calibrate an image displayed by the display. The color calibration device comprises a storage configured to store therein at least one of characteristic information of a display screen that is measured by a color sensor, and color calibration information acquired based on the color sensor; and a controller configured to calibrate a color of the display apparatus based on at least one of the characteristic information and the color calibration information.

According to an aspect of another exemplary embodiment, there is provided a display system including: a personal computer (PC) which comprises a storage configured to store therein at least one of characteristic information of a display screen measured by a color sensor and color calibration information that is acquired based on the color sensor, and a controller configured to assume a calibration coefficient to calibrate a color of the display apparatus based on at least one of the characteristic information and the color calibration information; and a display apparatus which comprises a color manager configured to calibrate the color of the display apparatus by reflecting the assumed calibration coefficient.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Figure 1:
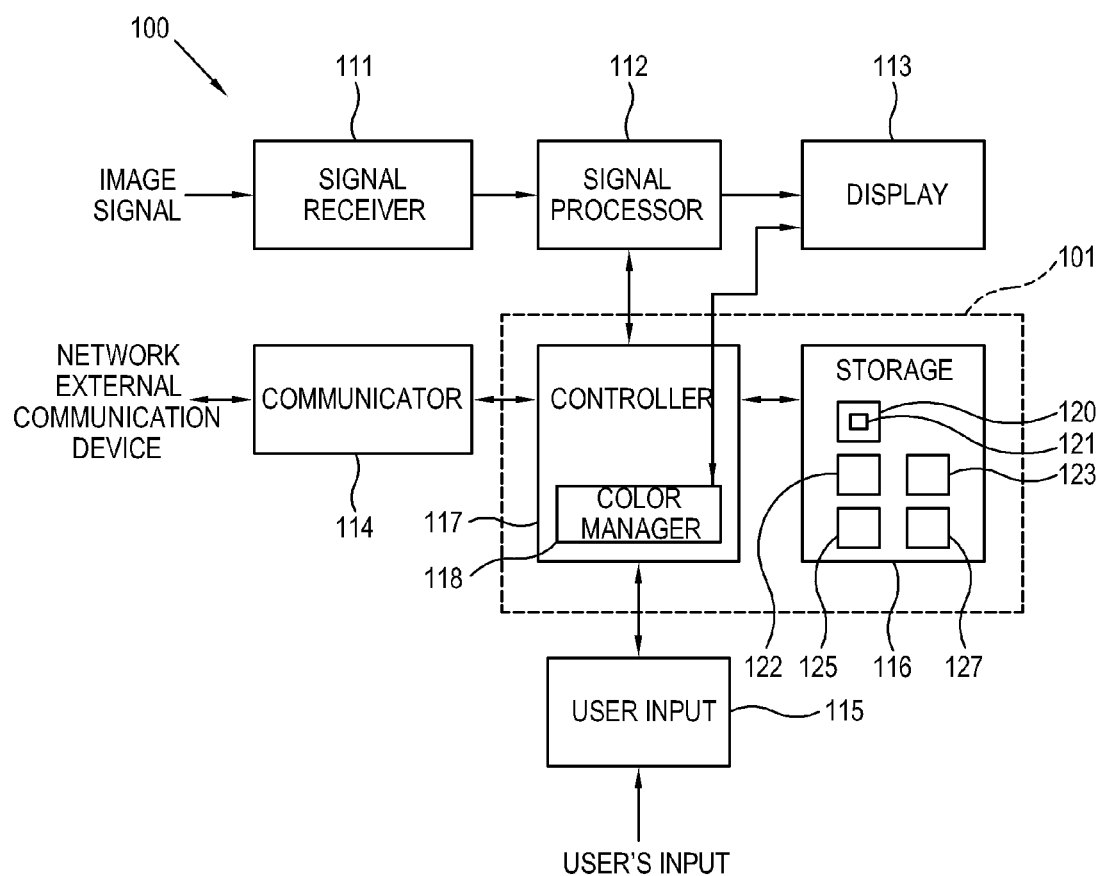
FIG. 1 is a block diagram of a display apparatus which includes a color calibration device according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

Hereinafter, a color calibration device, a color calibration method thereof, a display apparatus and a display system having the same according to an exemplary embodiment will be described in detail with reference to accompanying drawings.

FIG. 1 is a block diagram of a display apparatus which includes a color calibration device according to an exemplary embodiment.

As shown therein, a display apparatus 100 may be implemented as a television (TV), and receives and processes an image signal, and displays an image based on the processed image.

The display apparatus 100 shown in FIG. 1 includes a signal receiver 111, a signal processor 112, a display 113, a communicator 114, a user input 115, a storage 116 and a controller 117.

The signal receiver 111 receives an image signal from an external source. The image signal received by the signal receiver 111 includes a broadcasting signal such as a digital TV (DTV) signal and a cable broadcasting signal. In such a case, the signal receiver 111 may tune and receive a broadcasting signal of a channel selected by a user, by a control of the controller 117.

The image signal received by the signal receiver 111 may further include a signal output by an imaging device such as a digital versatile disc (DVD) player and a blue-ray disc (BD) player. Further, the signal receiver 111 may receive an audio signal to output an audio, and a data signal to output data information. The image signal, audio signal and data signal according to the present exemplary embodiment may be received together through a single signal.

The signal processor 112 processes the image signal received by the signal receiver 111 to display an image on the display 113 based on the processed image signal. The image processing operation performed by the signal processor 112 includes decoding, image enhancing and scaling. The signal processor 112 may further process an audio signal and a data signal received by the signal receiver 111.

The display 113 displays an image thereon based on an image signal processed by the signal processor 112. The display 113 may be a liquid crystal display (LCD) to display an image thereon. In such a case, the display 113 may include an LCD panel, a panel driver and a backlight unit, which are not shown. The display 113 may display thereon data information included in a data signal that is processed by the signal processor 112.

The display apparatus 100 may further include an audio output such as a speaker to output an audio based on an audio signal that is processed by the signal processor 112.

The communicator 114 communicates with a communication device (not shown) through a network such as the Internet. Otherwise, the communicator 114 may communicate with a communication device (not shown) through near field communication such as Bluetooth. The communicator 113 performs communication by a control of the controller 117, and may transmit information to a counterpart communication device and receive information therefrom. The information received by the communicator 114 from the counterpart communication device may include at least one of an image, an audio and data, all of which may be processed consistently with their nature and then output to the display 113.

The user input 115 is used to receive a user's input, and may be implemented as, e.g., a remote controller or a manipulation panel. The user input 115 may include an input key for selecting turning on and off of the display apparatus 100. A user's input that is received by the user input 115 is transmitted to the controller 117.

The storage 116 stores data and information of the display apparatus 100 therein. The storage 116 may be implemented as, e.g., a non-volatile memory such as a flash memory or a hard disc, but is not limited thereto.

The storage 116 forms a color calibration device 101 according to the present exemplary embodiment, together with the controller 117. The color calibration device 101 includes a main storage 120, first and second display characteristic storages 122 and 123, and first and second calibration trace storages 125 and 127.

The main storage 120 stores therein firmware or operating system (OS) 121 as a control program necessary for driving the display apparatus 100 and other application programs.

The first display characteristic storage 122 stores first characteristic information of a display screen of the display 113 therein that is measured by a color sensor (not shown) when the display apparatus 100 is manufactured. The first characteristic information may include a first color patch that is measured by the color sensor which measures color coordinates X, Y and Z. The first color patch includes color coordinates X, Y and Z of R, G, B and W which are measured by the color sensor with respect to a particular point, i.e., a central point of the display 113 after applying standard R, G, B and W values to the display 113.

The first color patch stored in the first display characteristic storage 122 as above may be updated when the display apparatus 100 is repaired during an after service (A/S). Such update may be performed by a manufacturer update tab 173 of an update selection part 170 in a graphic user interface (GUI) 150 (refer to FIG. 3).

The first calibration trace storage 123 stores therein first color calibration information that is acquired by color calibration preformed using the color sensor. The first color calibration information may include first seed calibration coefficients of a plurality of first seed points (i.e., interim trace points prior to reaching a target color) (hereinafter, the "seed point") that has been acquired when color calibration is repeatedly performed with respect to the display 113 through the color sensor to obtain a desired color when the display apparatus 100 is manufactured.

Figure 2A:
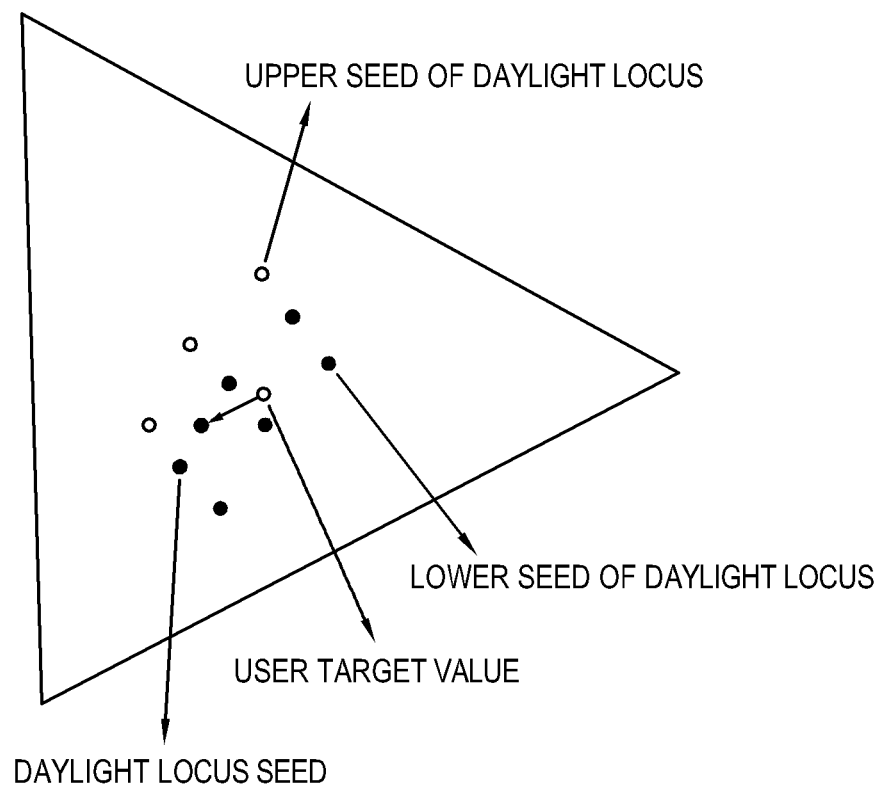
FIGS. 2A and 2B illustrate a color gamut in a xy color space illustrating seed points and seed calibration coefficients used by the color calibration device according to the exemplary embodiment.

As shown in FIG. 2A, the plurality of first seed points may include seed points of a daylight locus located in respective daylight loci of R, G, B and W, and upper and lower seed points of the daylight locus located above and below the seed points of daylight loci of R, G, B and W.

The first seed calibration coefficients are RGB digital calibration coefficients $C^{PT}$ which are obtained by converting, through a formula 1 as set forth below, color coordinates X, Y and Z of R, G, B and W measured by the color sensor at color space coordinate positions PT of first seed points that is obtained when color calibration is repeatedly performed with respect to the display 113 by using the color sensor to obtain a target color:

$$C^{PT} = \begin{bmatrix} X_{r,display} & X_{g,display} & X_{b,display} \\ Y_{r,display} & Y_{g,display} & Y_{b,display} \\ Z_{r,display} & Z_{g,display} & Z_{b,display} \end{bmatrix}^{-1} \begin{pmatrix} X_{PT} \\ Y_{PT} \\ Z_{PT} \end{pmatrix} = \begin{bmatrix} R_\gamma \\ G_\gamma \\ B_\gamma \end{bmatrix} \quad \text{[Formula 1]}$$

In the formula 1 above, PT means color space coordinate positions of the first seed points.

Figure 2B:
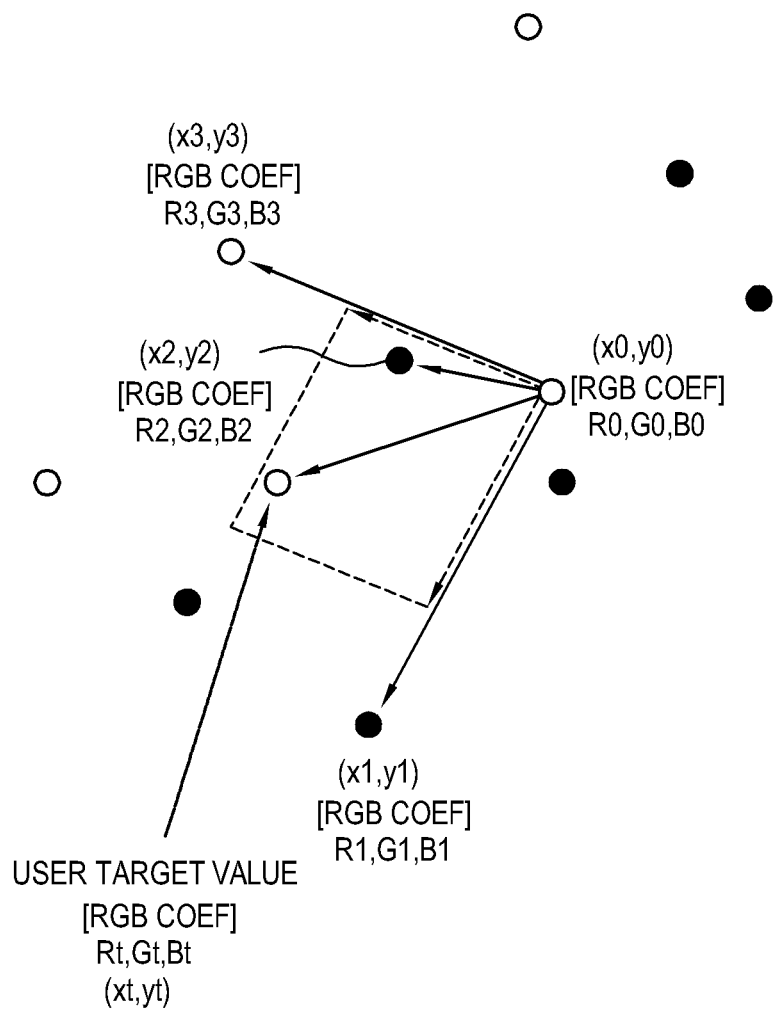

For example, as shown in FIG. 2b, if an RGB digital coefficient $C^{P0}$ (R0, G0 and B0) of present color space coordinate (x0, y0), brightness of which is 200 cd and white point of which is 7000, at a light source D65 is calibrated into an RGB digital coefficient $C^{Pt}$; (Rt, Gt and Bt) of target color space coordinates (xt, yt), brightness of which is 150 cd and white point of which is 6500, even though color calibration is performed inputting the brightness of 150 cd and the white point of 6500 as setting values, a calibrated RGB digital coefficient in the color space coordinate measured by the color sensor after calibration does not conform to the RGB digital coefficient $C^{Pt}$ (Rt, Gt and Bt) in the target color space coordinates (xt, yt). Accordingly, to obtain the RGB digital coefficient $C^{Pt}$ (Rt, Gt and Bt) in the target color space coordinates (xt, yt), color calibration should be repeated until the calibrated RGB digital coefficient in the color space coordinate measured by the color sensor after calibration conforms to the RGB digital coefficient $C^{Pt}$ (Rt, Gt and Bt) in the target color space coordinates (xt, yt). Here, the color space coordinates measured by the color sensor after calibration, e.g., (x1, y1), (x2, y2) and (x3, y3) become seed points, and the RGB digital calibration coefficients at the seed points become first seed calibration coefficients.

The first seed calibration coefficients which are stored in the first calibration trace storage 123 may be updated, like the first color patch stored in the first display characteristic storage 122, when the display apparatus 100 is in A/S for repairing. Such update may be performed through the manufacturer update tab 173 of the update selection part 170 in the GUI 150 like the first color patch.

The second display characteristic storage 125 stores therein second characteristic information of a display screen of the display 113 that is measured by the color sensor. The second characteristic information may include a second color patch that is measured by a user through the color sensor when the display apparatus 100 is used Like the first color patch, the second color patch is color coordinates X, Y and Z of R, G, B and W that are measured by the color sensor with respect to a particular point, e.g., a central point of the display 113 after standard R, G, B and W values are applied to the display 113.

The second color patch that is stored in the second display characteristic storage 125 as above is measured and stored through the user update tab 171 of the update selection part 170 in the GUI 150, and when change in the display 113 with passage of time occurs, may be updated by the user update tab 171 at a user's option.

The second calibration trace storage 127 stores second color calibration information that is acquired by the color sensor. The second color calibration information may include second seed calibration coefficients of a plurality of second seed points that are obtained when color calibration is repeatedly performed with respect to the display 113 to obtain a target color by a user through the color sensor during use of the display apparatus 100.

The plurality of second seed points and corresponding second seed calibration coefficients are obtained in the same manner as that of the plurality of first seed points and the first seed calibration coefficients. The plurality of second seed points and corresponding second seed calibration coefficients may be acquired and stored or updated through the user update tab 171 of the update selection part 170.

The second seed calibration coefficients which are stored in the second calibration trace storage 127 may be updated at a user's option upon change in the display 113 with passage of time, like the second color patch stored in the second display characteristic storage 125. Such update may be performed through the user update tab 171 of the update selection part 170.

The controller 117 controls other elements of the display apparatus 100 as a whole, and may include a central processing unit (CPU) and a random access memory (RAM) for executing firmware as a control program or the OS 121 stored in the main storage 120.

The controller 117 may assume calibration coefficients corresponding to setting values by using the first color patch stored in the first display characteristic storage 122 and/or the first seed calibration coefficients stored in the first calibration trace storage 123 to calibrate colors of the display 113 based on the setting values that have been set through the GUI 150.

To do so, the firmware or the OS 121 may include a color calibration program which calculates the calibration coefficients based on the first color patch and/or the first seed calibration coefficients. The color calibration program may be stored in the main storage 120 separately from the OS 121 rather than being included in the OS 121.

If a user executes the color calibration program by inputting his/her command through the user input unit 115, the controller 117 may drive the color calibration program and display the GUI 150 on the display 113 to allow a user to input the setting values to set desired colors of the display 113.

Figure 3:
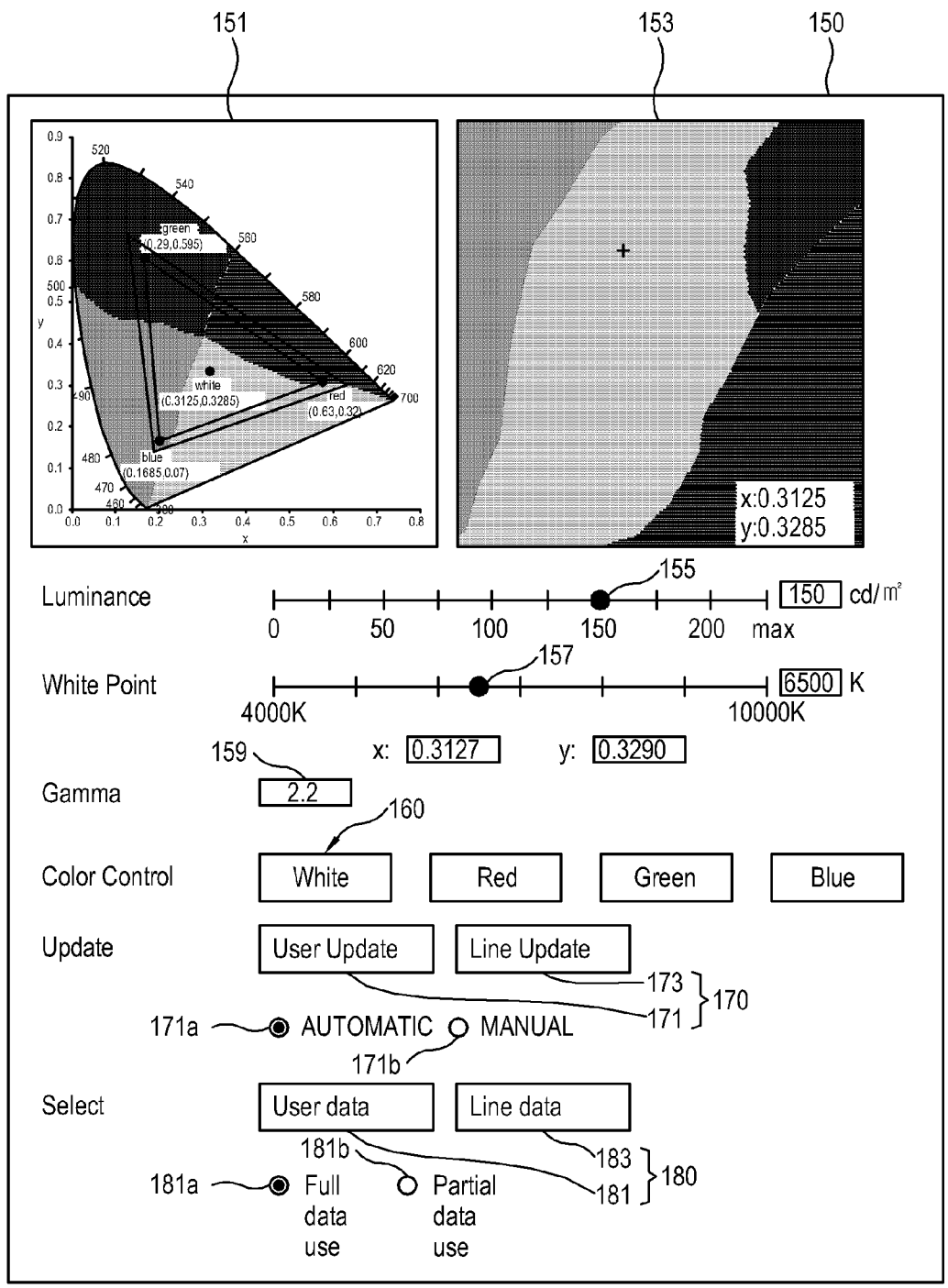
FIG. 3 illustrates a graphic user interface (GUI) used by the color calibration device according to the exemplary embodiment.

As shown in FIG. 3, if a white point is set as 6500K in a light source D65 200 cd, a color gamut graph 151 in the color space xy of the display 113, and a color space coordinate 153 of the white point are provided on upper left and upper right sides of the GUI 150, and a luminance input part 155, a white point value input part 157, a gamma value input part 159, a color selection part 160, the update selection part 170 and a usage data selection part 180 are provided below the color gamut graph 151 and the color space coordinate 153 in the GUI 150.

The luminance input part 155 is used to input a luminance value, and if a control point located on the scale is moved to left and right sides of the scale toward a desired graduation, the luminance input part 155 is configured to automatically input a corresponding luminance value.

The white point value input part 157 is used to input a white point. If a control point located on the scale is moved to left and right sides of the scale toward a desired graduation, a corresponding white point value is automatically input. The white point value input part 157 includes an input space provided below the white point value input part 157 thereof through which a user may input xy color space coordinates as numbers.

The gamma input part 159 is used to input a gamma value, and is configured to input gamma values as numbers.

The color selection part 160 is used to select colors to be calibrated, and includes R, G, B and W tabs to select R, G, B and W as colors to be calibrated.

The update selection part 170 includes the manufacturer update tab 173 and the user update tab 171.

Figure 4:
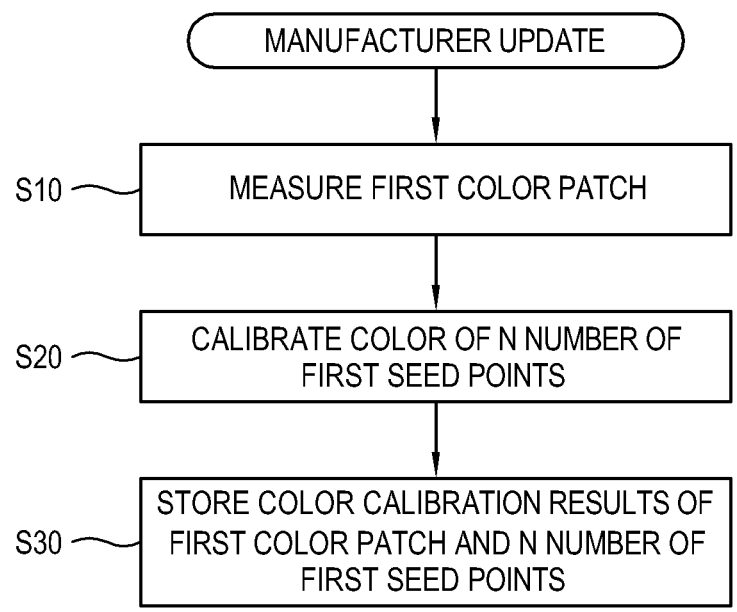
FIG. 4 is a flowchart illustrating a manufacturer update process of the color calibration device according to the exemplary embodiment.

The manufacturer update tab 173 is used to update the first color patch and first seed calibration coefficients measured through the color sensor by the manufacturer, when the display 113 is in A/S for repairing. As shown in FIG. 4, if the manufacturer update tab 173 is selected, the controller 117 automatically measures the first color patch in connection with the color sensor (S10), and performs color calibration with preset setting values to calculate first seed calibration coefficients of a plurality of first seed points as interim trace points prior to reaching a target color (S20), and stores the first color patch and the first seed calibration coefficients obtained from the foregoing process (S30). The first color patch and the first seed calibration coefficients may be displayed in a manufacturer update sub-display screen (not shown) which is shown after the manufacturer update tab 173 is selected.

The user update tab 171 is used to update the second color patch measured by the user through the color sensor and the second seed calibration coefficients of the plurality of seed points that are obtained when color calibration is repeatedly performed, according to the user's option when the change in the display 113 with passage of time occurs. The user update tab 171 includes an automatic update item 171*a* and a manual update item 171*b*.

Figure 5:
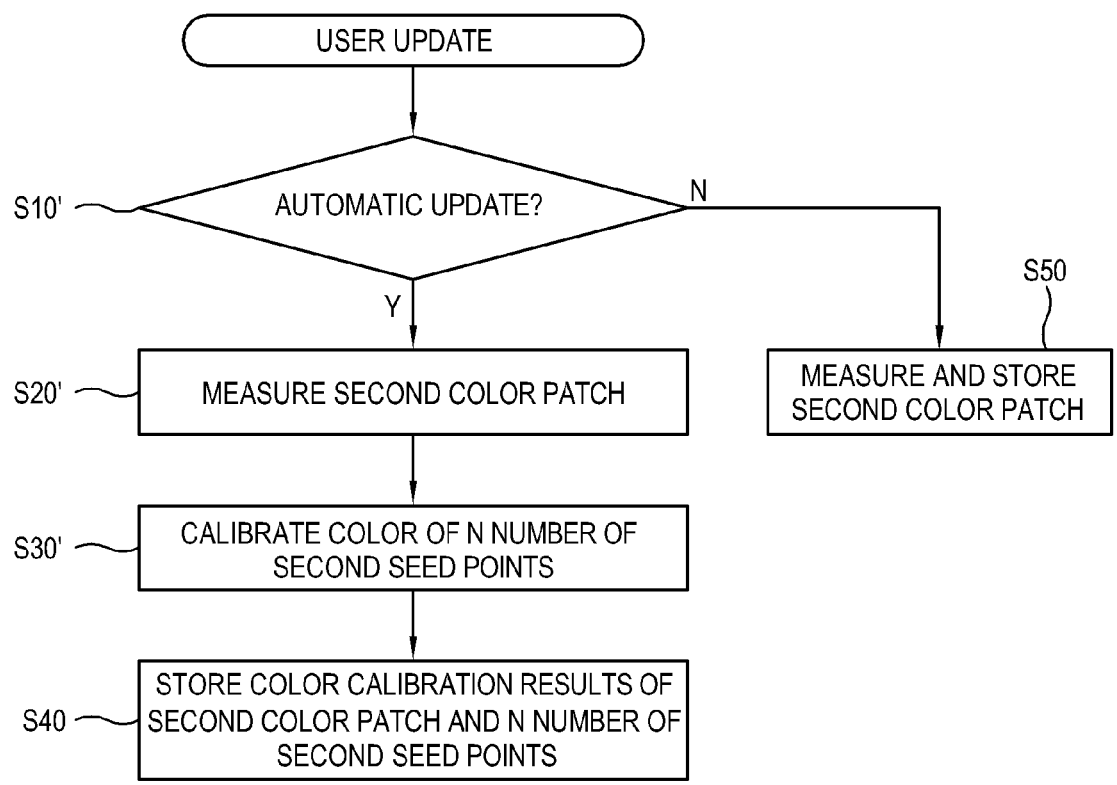
FIG. 5 is a flowchart illustrating a user updating process of the color calibration device according to the exemplary embodiment.

As shown in FIG. 5, if the user update tab 171 is selected, the controller 117 determines whether the automatic update item 171*a* has been selected (S10'). If the automatic update item 171*a* has been selected, the controller 117 automatically measures the second color patch in connection with the color sensor (S20'), and performs color calibration with preset setting values to calculate the second seed calibration coefficients of the plurality of second seed points (S30'), and stores the second color patch and the second seed calibration coefficients obtained from the foregoing process (S40). The second color patch and the second seed calibration coefficients may be displayed by a user update sub-display screen (not shown) that is shown after the user update tab 171 is selected. If it is determined that the manual update item 171*b* has been selected at operation S10', the controller 117 enables the user to manually measure and store color coordinates X, Y and Z of R, G, B and W of the second color patch by using the color sensor, according to a user's input made through the user update sub-display screen (S50).

The usage data selection part 180 includes a manufacturer data usage tab 183 and a user data usage tab 181.

If the manufacturer data usage tab 183 is selected, the controller 117 assumes the first calibration coefficient corresponding to the setting value by a predictive mapping method using the first color patch stored in the first display characteristic storage 122 and the first calibration coefficients stored in the first calibration trace storage 123.

Figure 6:
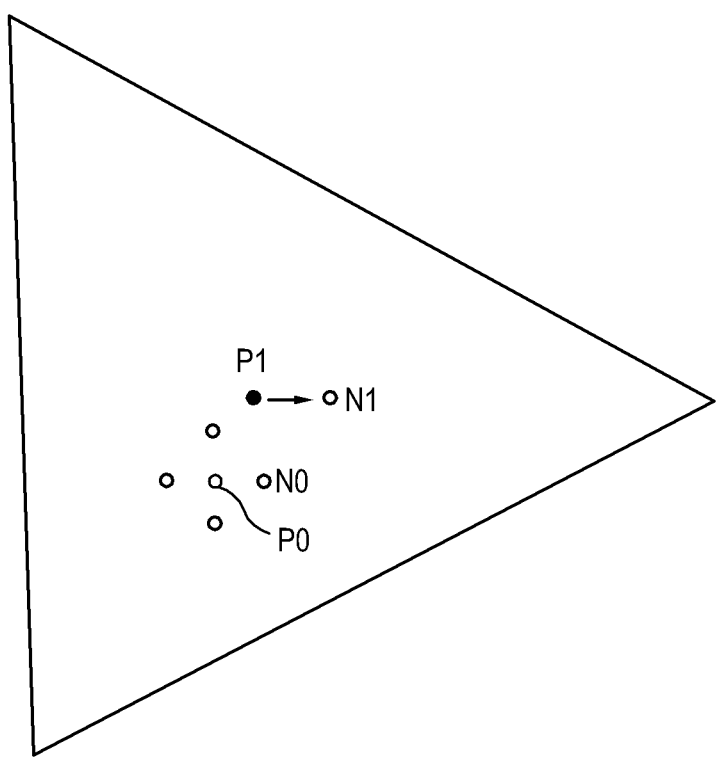
FIG. 6 illustrates a color gamut in the xy color space illustrating a predictive mapping of the color calibration device according to the exemplary embodiment.

More specifically, as shown in FIG. 6, the controller 117 calculates a calibration coefficient $C^{P0}$ of a position P0 in a specific color space coordinate T1 that has been calibrated by using only color coordinates X, Y and Z of R, G, B and W of the first color patch stored in the first display characteristic storage 122, by a formula 2 set forth below:

$$C^{P0} = \begin{bmatrix} X_{r,display} & X_{g,display} & X_{b,display} \\ Y_{r,display} & Y_{g,display} & Y_{b,display} \\ Z_{r,display} & Z_{g,display} & Z_{b,display} \end{bmatrix}^{-1} \begin{pmatrix} X_{P0} \\ Y_{P0} \\ Z_{P0} \end{pmatrix} \quad \text{[Formula 2]}$$

As a result, the calibration coefficient $C^{P0}$ is obtained by a formula 3 set forth below:

$$C^{P0} = \begin{bmatrix} PO_{rr} & PO_{rg} & PO_{rb} \\ PO_{gr} & PO_{gg} & PO_{gb} \\ PO_{br} & PO_{bg} & PO_{bb} \end{bmatrix} \quad \text{[Formula 3]}$$

Then, the controller 117 calculates a calibration coefficient $C^{N0}$ of a position N0 in a color space coordinate T0 that has been set as a target value by a user and calibrated by using only the color coordinates X, Y and Z of R, G, B and W of the first color patch stored in the first display characteristic storage 122, by a formula 4 set forth below:

$$C^{N0} = \begin{bmatrix} X_{r,display} & X_{g,display} & X_{b,display} \\ Y_{r,display} & Y_{g,display} & Y_{b,display} \\ Z_{r,display} & Z_{g,display} & Z_{b,display} \end{bmatrix}^{-1} \begin{pmatrix} X_{N0} \\ Y_{NN0} \\ Z_{N0} \end{pmatrix} \quad \text{[Formula 4]}$$

As a result, the calibration coefficient $C^{N0}$ is obtained by a formula 5 set forth below:

$$C^{N0} = \begin{bmatrix} NO_{rr} & NO_{rg} & NO_{rb} \\ NO_{gr} & NO_{gg} & NO_{gb} \\ NO_{br} & NO_{bg} & NO_{bb} \end{bmatrix} \quad \text{[Formula 5]}$$

Then, the controller 117 calculates a calibration coefficient $C^{P1}$ of a position P1 in a specific color space coordinate T1 that has been calibrated through the color sensor by using the first seed calibration coefficient corresponding to the position P0 in the specific color space coordinate T1 stored in the first calibration trace storage 123, by a determinant 6 set forth below:

$$C^{P1} = \begin{bmatrix} C_{rr} & C_{rg} & C_{rb} \\ C_{gr} & C_{gg} & C_{gb} \\ C_{br} & C_{bg} & C_{bb} \end{bmatrix} \quad \text{[Formula 6]}$$

Since the calibration coefficient $C^{P0}$ of the position P0 in the specific color space coordinate T1 that has been calibrated by using only the color coordinates X, Y and Z of R, G, B and W of the first color patch (Formula 3); the calibration coefficient $C^{N0}$ of the position N0 in the color space coordinate T0 that has been set as the target value by the user and calibrated by using only the color coordinates X, Y and Z of R, G, B and W of the first color patch (Formula 5); and the calibration coefficient $C^{P1}$ of the position P1 in the specific color space coordinate T1 that has been calibrated through the color sensor by using the first seed calibration coefficient corresponding to the position P0 in the specific color space coordinate T1 (Formula 6) have been obtained, a calibration coefficient $C^{N1}$ of the position N1 in the color space coordinate T0 that has been set as the target value by the user as if being practically calibrated through the color sensor may be assumed from a formula 7 set forth below:

$$C^{N1} = C^{P1} \times C^{N0}/C^{P0} \quad \text{[Formula 7]}$$

As a result, the calibration coefficient $C^{N1}$ of the position N1 in the color space coordinate T0 that has been set as the target value by the user as if being actually calibrated through the color sensor may be obtained by a formula 8 set forth below:

$$C^{N1} = \begin{bmatrix} CC_{rr}\frac{NO_{rr}}{PO_{rr}} & CC_{rg}\frac{NO_{rg}}{PO_{rg}} & CC_{rb}\frac{NO_{rb}}{PO_{rb}} \\ CC_{gr}\frac{NO_{gr}}{PO_{gr}} & CC_{gg}\frac{NO_{gg}}{PO_{gg}} & CC_{gb}\frac{NO_{gb}}{PO_{gb}} \\ CC_{br}\frac{NO_{br}}{PO_{br}} & CC_{bg}\frac{NO_{bg}}{PO_{bg}} & CC_{bb}\frac{NO_{bb}}{PO_{bb}} \end{bmatrix} \quad \text{[Formula 8]}$$

The color manager 118, which is included in the controller 117, adjusts a register value for calibrating color of the display 113 to reflect the obtained calibration coefficient $C^{N1}$, and controls the display 113 to display the calibrated color. The color manager 118 may be formed as a chip, but is not limited thereto.

If the user data usage tab 183 is selected, the controller 117 assumes the second calibration coefficient corresponding to the setting value by the predictive mapping method using the second color patch stored in the second display characteristic storage 125 and the second seed calibration coefficients stored in the second calibration trace storage 127.

The method of assuming the second calibration coefficient is the same as the method of assuming the first calibration coefficient that has been explained with reference to FIG. 6, and a detailed explanation thereof will be omitted.

If the second seed calibration coefficients of the plurality of second seed points are not stored in the second calibration trace storage 127 or the second color patch stored in the second display characteristic storage 125 is updated and the second seed calibration coefficients stored in the second calibration trace storage 127 are not updated, the controller 117 may calculate the calibration coefficient $C^{N0}$ by the formulas 4 and 5 by using the second color patch only, and use the calculated calibration coefficient $C^{N0}$ as the second calibration coefficient.

To do so, as shown in FIG. 3, the user data usage tab 181 may further include an all data usage item 181a which selects to assume the second calibration coefficient by using both the second color patch and the second seed calibration coefficients; and a partial data usage item 181b which selects to assume the second calibration coefficients by the formulas 4 and 5 by using the second color patch only.

Figure 7:
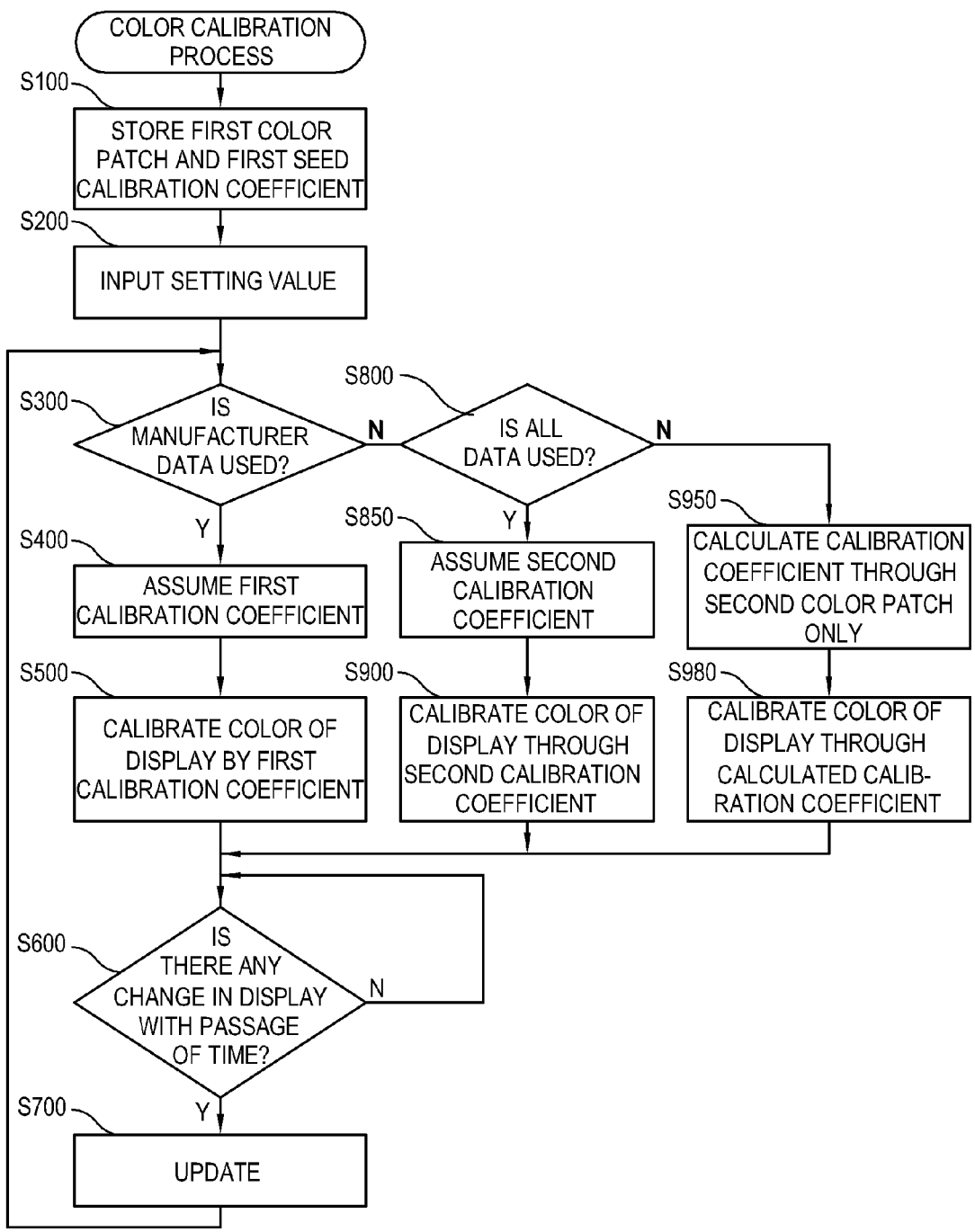
FIG. 7 is a flowchart illustrating a color calibration process of the color calibration device according to the exemplary embodiment.

Hereinafter, a color calibration operation of the display apparatus 100 which includes the color calibration device 101 according to the exemplary embodiment will be described in detail with reference to FIG. 7.

A first color patch is measured by the color sensor with respect to the display screen when the display apparatus 100 is manufactured, and the first color patch measured as above is stored in the first display characteristic storage 122. First seed calibration coefficients of a plurality of first seed points are measured by the color sensor when color calibration is repeatedly performed by the color sensor, and the first seed calibration coefficients measured as above are stored in the first calibration trace storage 123 (S100).

When the display apparatus 100 is delivered to the user and used by him/her, upon execution of the color calibration program from the OS 121 by the user through the user input unit 115 as shown in FIG. 3, the controller 117 displays the GUI 150 on the display 113. If the GUI 150 is displayed, the user inputs a luminance value, a white point value and a gamma value as setting values for setting desired color of the display apparatus 100 (S200). The user selects the manufacturer data usage tab 173 to obtain calibration coefficients through the first color patch and the first seed calibration coefficients.

Then, the controller 117 determines whether the user has selected the manufacturer data usage tab 173 (S300). If it is determined that the user has selected the manufacturer data usage tab 173, the controller 117 obtains the first calibration coefficient by using the first color patch and the first seed calibration coefficients of the plurality of first seed points as described above in connection with FIG. 6 (S400).

If the first calibration coefficient is obtained, the color manager 118 of the controller 117 calibrates color of the display 113 by reflecting the assumed first calibration coefficient (S500).

As a result, the display 113 may display an image in calibrated color.

Thereafter, if color calibration performed by the first color patch and the first seed calibration coefficients is not accurate due to a change in the display 113 with passage of time as the display 113 is used (S600), the user may apply for A/S to the manufacturer of the display apparatus 100 and update the first color patch and the first seed calibration coefficients (S700).

The first color patch and the first seed calibration coefficients are updated through the GUI 150 displayed on the display 113 after the A/S engineer executes the color calibration program from the OS 121 through the user input 115.

If the A/S engineer selects the manufacturer update tab 173 of the update selection part 170 displayed on the GUI 150, the controller 117 automatically updates the first color patch and the first seed calibration coefficients as explained above with reference to FIG. 4.

Optionally, if the user does not apply for A/S to the manufacturer of the display apparatus 100 to update the first color patch and the first seed calibration coefficients (operation S700), the user may execute the color calibration program through the user input 115, measure the second color patch of the display screen by using the color sensor and store the second color patch in the second display characteristic storage 125, and may store in the first calibration trace storage 127 the second seed calibration coefficients of the plurality of second seed points that have been measured by the color sensor when color calibration is repeatedly performed through the color sensor.

The second color patch and the second seed calibration coefficients of the plurality of second seed points are stored by the user through the user update tab 171 of the update selection part 170 in the GUI 150 displayed on the display 113 after the color calibration program is executed from the OS 121 by the user through the user input 115. Storing the second color patch and the second seed calibration coefficients of the plurality of seed points through the user update tab 171 is as explained above with reference to FIG. 5.

At the operation S300, if the user selects the user data usage tab 171 to assume the calibration coefficient by using the second color patch and the second seed calibration coefficients, the controller 117 determines whether the all data usage item 181a has been selected (S800).

If it is determined that the all data usage item 181a has been selected, the controller 117 assumes the second calibration coefficient by using the second color patch and the second seed calibration coefficients of the plurality of second seed points similar to the method of assuming the first calibration coefficient explained in connection with FIG. 6 (S850).

If the second calibration coefficient is assumed thereafter, the color manager 118 of the controller 117 calibrates colors of the display 113 by reflecting the obtained second calibration coefficient (S900), and performs operations following the operation S600.

At the operation S800, if it is determined that the partial data usage item 181b has been selected, the controller 117 calculates the calibration coefficient $C^{N0}$ by the formulas 4 and 5 by using the second color patch only (S950).

If the calibration coefficient $C^{N0}$ is calculated, the color manager 118 calibrates colors of the display 113 by reflecting the calculated calibration coefficient (S980), and performs operations following the operation S600.

The display apparatus 100 according to the present exemplary embodiment has been exemplified and explained that the storage 116 includes the first and second display characteristic storages 122 and 123, and the first and second calibration trace storages 125 and 127, but is not limited thereto. Alternatively, the storage 116 may include only one of the first display characteristic storage 122 and the first calibration trace storage 125, and the second display characteristic storage 123 and the second calibration trace storage 127. In such a case, the update selection part 170 in the GUI 150 may include corresponding one of the manufacturer update tab 171 and the user update tab 173, and the usage data selection part 180 may include corresponding one of the manufacturer data usage tab 183 and the user data usage tab 181.

Figure 8:
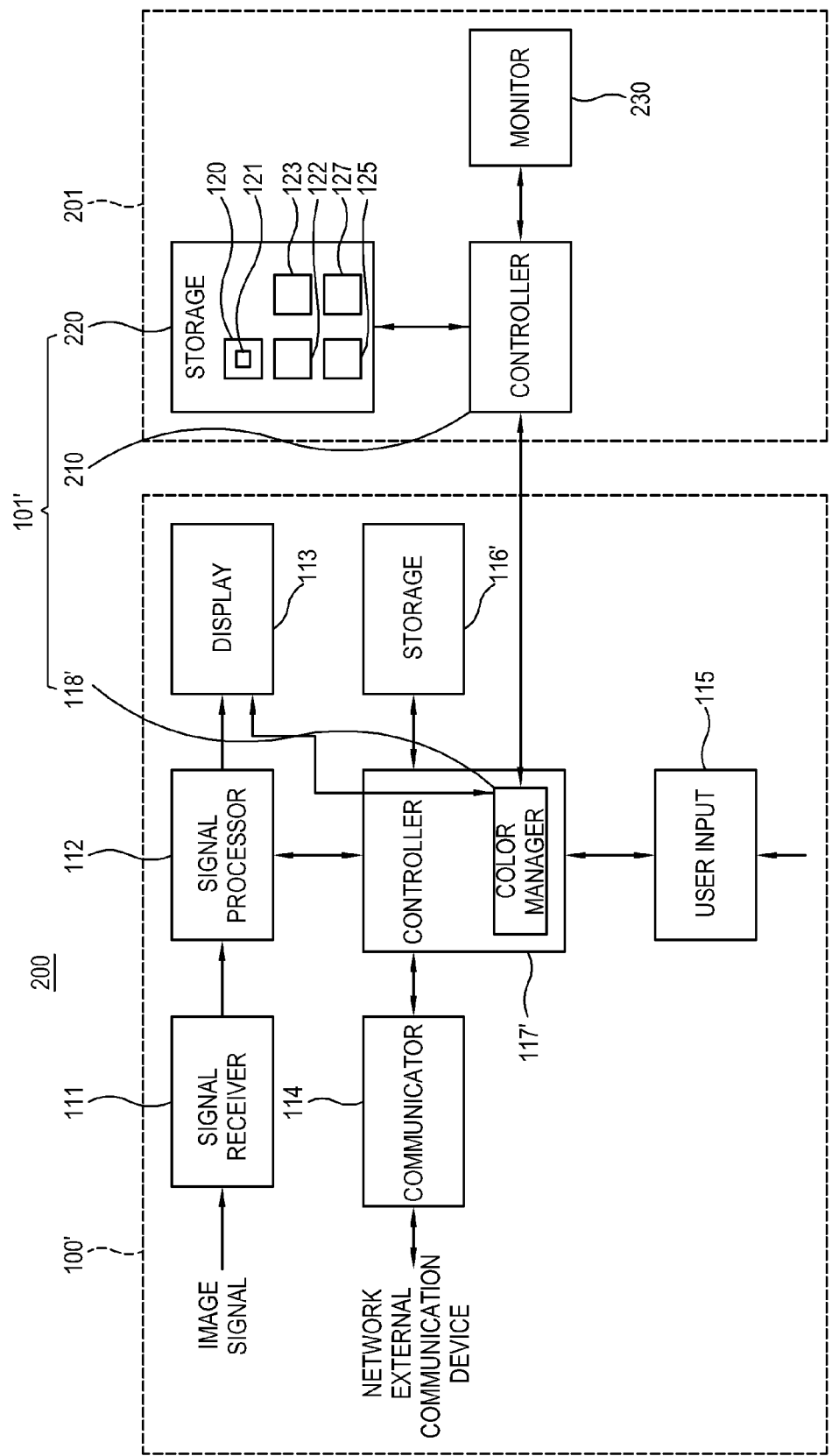
FIG. 8 is a block diagram of a display system which includes a color calibration device according to another exemplary embodiment.

It has been exemplified and explained that the color calibration device 100 according to the present exemplary embodiment includes the controller 117 and the storage 116 to apply to the display apparatus 100, but the exemplary embodiments are not limited thereto. Alternatively, as shown in FIG. 8, a color calibration device 101' may include a controller 210 and a storage 220 which are included in a PC 201, and a color manager 118' included in a controller 117' of a display apparatus 100' to be applied to a display system 200. The storage 220 includes a main storage 120, first and second display characteristic storages 122 and 123 and first and second calibration trace storages 125 and 127, and has the same configuration and function as the storage 116 shown in FIG. 1. Except for controlling overall operations of the PC including a monitor 230 compared to the controller 117 in FIG. 1, the controller 210 has the same function for obtaining the first or second calibration coefficient corresponding to the setting value by using the first or second color patch stored in the first or second display characteristic storages 122 and 125, and the first or second seed calibration coefficients stored in the first or second calibration trace storages 123 and 127. Similar to the color manager 118 shown in FIG. 1, the color manager 118 of the controller 117' of the display apparatus 100' calibrates color of the display apparatus 100' by reflecting the first or second calibration coefficient that has been obtained by the controller 210 of the PC 201.

As explained above, the color calibration devices 101 and 101', the color calibration method thereof, and the display apparatus 100 and the display system 200 having the same according to the present exemplary embodiment stores the characteristic information of the display 113 such as the color patch measured through the color sensor and the color calibration information such as the seed calibration coefficients of the plurality of seed points measured through the color sensor when color calibration is repeatedly performed, and obtains the calibration coefficient corresponding the setting value for color calibration by the predictive mapping method using the stored characteristic information and/or color calibration information when color calibration is needed. Accordingly, the present exemplary embodiment may provide the same degree of accuracy in color calibration without a separate color sensor, as that with a color sensor. As a result, the display apparatus 100 may accurately realize an image in desired colors.

The present exemplary embodiment automatically performs color calibration through the color calibration program if the setting value for color calibration is input through the GUI 150 without the color sensor, and thus it is easy to use and can be manufactured or configured for reasonable price.

Even upon a change in the display 113 with passage of time due to long-term usage, the stored characteristic information and/or color calibration information may be updated through A/S of the manufacturer or through direct input by the user, and the degree of accuracy in color calibration may be prevented from being deteriorated even upon change in the display 113 with passage of time.

Although a few exemplary embodiments have been shown and described, it will be appreciated by those skilled in the art that changes may be made in these exemplary embodiments without departing from the principles and spirit of the inventive concept, the range of which is defined in the appended claims and their equivalents.

What is claimed is:

1. A color calibration device of a display apparatus, the color calibration device comprising:
a storage configured to store characteristic information of a display screen that is measured by a color sensor, and color calibration information acquired by the color sensor; and
a controller configured to calibrate a color of the display apparatus based on the characteristic information and the color calibration information,
wherein the controller is further configured to:
determine a first target calibration coefficient for target color coordinates based on the characteristic information;
convert the first target calibration coefficient into a second target calibration coefficient based on a relation between a first reference calibration coefficient, which is calculated for reference color coordinates based on the characteristic information, and a second reference calibration coefficient which is calculated for the reference color coordinates based on the color calibration information, and
calibrate the color of the display apparatus based on the second target calibration coefficient.

2. The color calibration device according to claim 1, wherein the characteristic information comprises a color patch that is measured by the color sensor with respect to the display screen.

3. The color calibration device according to claim 2, wherein the color patch comprises color coordinates X, Y and Z of red (R), green (G), blue (B) and white (W).

4. The color calibration device according to claim 2, wherein the color calibration information comprises a plurality of seed calibration coefficients that are acquired with respect to a plurality of seed points when color calibration is performed at least twice.

5. The color calibration device according to claim 4, wherein the seed calibration coefficients comprise RGB digital calibration coefficients of seed points that have been measured by the color sensor.

6. The color calibration device according to claim 4, wherein the controller is configured to obtain a calibration coefficient corresponding to a setting value to calibrate the color of the display apparatus, that is set by a user, based on at least one of the color patch and the plurality of seed calibration coefficients, and calibrate the color of the display apparatus by reflecting the obtained calibration coefficient.

7. The color calibration device according to claim 6, wherein the controller is configured to receive the setting value to calibrate the color of the display apparatus through a color calibration program, and obtain a calibration coefficient corresponding to the setting value.

8. The color calibration device according to claim 7, wherein the color calibration program comprises a graphic user interface (GUI) configured to input the setting value.

9. The color calibration device according to claim 8, wherein the GUI comprises a luminance input part configured to input a luminance value;

a white point value input part configured to input a white point; and a gamma input part configured to input a gamma value.

10. The color calibration device according to claim 9, wherein the GUI further comprises an update part which comprises a manufacturer update tab configured to update the first color patch and the first seed calibration coefficients that are measured when the display apparatus is manufactured, to values measured during an after service operation (A/S) of the display apparatus.

11. The color calibration device according to claim 10, wherein the update part further comprises a update tab configured to update a second color patch and second seed calibration coefficients that have been previously measured, to values subsequently measured.

12. The color calibration device according to claim 9, wherein the GUI further comprises a usage data selection part which comprises a manufacturer data selection tab configured to obtain a first calibration coefficient corresponding to the setting value based on the first color patch and the first seed calibration coefficients, and a data selection tab configured to obtain a second calibration coefficient corresponding to the setting value based on the second color patch and the second seed calibration coefficients.

13. The color calibration device according to claim 1, wherein the storage comprises a first display characteristic storage configured to store a first color patch measured with respect to the display screen through the color sensor when the display apparatus is manufactured; and a first calibration trace storage configured to store first seed calibration coefficients of a plurality of first seed points measured by the color sensor when color calibration is performed at least twice through the color sensor when the display apparatus is manufactured.

14. The color calibration device according to claim 13, wherein the storage comprises a second display characteristic storage configured to store the second color patch measured through the color sensor with respect to the display screen; and a second calibration trace storage configured to store second seed calibration coefficients of a plurality of second seed points that are measured by the color sensor when color calibration is performed at least twice through the color sensor.

15. The color calibration device according to claim 1, wherein the storage comprises a second display characteristic storage configured to store a second color patch that is measured through the color sensor with respect to the display screen; and a second calibration trace storage configured to store second seed calibration coefficients of a plurality of second seed points that are measured by the color sensor when color calibration is performed at least twice through the color sensor.

16. A color calibration method of a display apparatus, the color calibration method comprising:

storing characteristic information of a display screen that is measured by a color sensor and color calibration information that is acquired by the color sensor; and calibrating a color of the display apparatus based on the characteristic information and the color calibration information, wherein the calibrating comprises:

determining a first target calibration coefficient for target color coordinates based on the characteristic information;

converting the first target calibration coefficient into a second target calibration coefficient based on a relation between a first reference calibration coefficient, which is calculated for reference color coordinates based on the characteristic information, and a second reference calibration coefficient which is calculated for the reference color coordinates based on the color calibration information; and calibrating the color of the display apparatus based on the second target calibration coefficient.

17. The color calibration method according to claim 16, wherein the storing comprises storing a first color patch that is measured with respect to the display screen by the color sensor when the display apparatus is manufactured; and storing first seed calibration coefficients of a plurality of first seed points which are measured by the color sensor when color calibration is performed at least twice by the color sensor when the display apparatus is manufactured.

18. The color calibration method according to claim 17, wherein the storing comprises storing a second color patch that is measured with respect to the display screen through the color sensor; and storing second seed calibration coefficients of a plurality of second seed points that are measured by the color sensor when color calibration is performed at least twice through the color sensor.

19. The color calibration method according to claim 18, further comprising one of updating the first color patch and the first seed calibration coefficients measured when the display apparatus is manufactured, to values measured when the display apparatus is repaired during an after-service (A/S) operation, and updating a second color patch and second seed calibration coefficients previously measured, to values subsequently measured.

20. The color calibration method according to claim 16, wherein the calibrating comprises inputting a setting value to set the color of the display apparatus;

obtaining a calibration coefficient corresponding to the setting value that is set based on at least one of a color patch and a plurality of seed calibration coefficients; and calibrating the color of the display apparatus by reflecting the obtained calibration coefficient.

21. The color calibration method according to claim 20, wherein the inputting comprises inputting the setting value through a graphic user interface (GUI).

22. The color calibration method according to claim 21, wherein the inputting comprises inputting a luminance value;

inputting a white point; and inputting a gamma value.

23. The color calibration method according to claim 21, wherein the inputting further comprises selecting a manufacturer update tab for updating a first color patch and first seed calibration coefficients measured when the display apparatus is manufactured, to values measured when the display apparatus is repaired during an after service (A/S) operation.

24. The color calibration method according to claim 20, wherein the inputting further comprises selecting whether to obtain a first calibration coefficient corresponding to the setting value based on the first color patch and the first seed calibration coefficients, or whether to obtain a second calibration coefficient corresponding to the setting value based on a second color patch and second seed calibration coefficients.

25. The color calibration method according to claim 16, wherein the storing comprises storing a second color patch that is measured with respect to the display screen through the color sensor; and storing second seed calibration coefficients of a plurality of second seed points that are measured by the color sensor when color calibration is performed at least twice through the color sensor.

26. A display apparatus comprising:

a display configured to display an image; and a color calibration device configured to calibrate an image displayed by the display, wherein the color calibration device comprises:

a storage configured to store characteristic information of a display screen that is measured by a color sensor, and color calibration information acquired by the color sensor; and a controller configured to calibrate a color of the display apparatus based on the characteristic information and the color calibration information, wherein the controller is further configured to:

determine a first target calibration coefficient for target color coordinates based on the characteristic information;

convert the first target calibration coefficient into a second target calibration coefficient based on a relation between a first reference calibration coefficient, which is calculated for reference color coordinates based on the characteristic information, and a second reference calibration coefficient which is calculated for the reference color coordinates based on the color calibration information, and calibrate the color of the display apparatus based on the second target calibration coefficient.

27. A display system comprising:

a personal computer (PC) which comprises a storage configured to store characteristic information of a display screen measured by a color sensor and color calibration information that is acquired by the color sensor, and a controller configured to obtain a calibration coefficient to calibrate a color of the display apparatus based on the characteristic information and the color calibration information; and a display apparatus which comprises a color manager configured to calibrate the color of the display apparatus by reflecting the obtained calibration coefficient, wherein the controller is further configured to:

determine a first target calibration coefficient for target color coordinates based on the characteristic information;

convert the first target calibration coefficient into a second target calibration coefficient based on a relation between a first reference calibration coefficient, which is calculated for reference color coordinates based on the characteristic information, and a second reference calibration coefficient which is calculated for the reference color coordinates based on the color calibration information, and calibrate the color of the display apparatus based on the second target calibration coefficient.

\* \* \* \* \*